(12) United States Patent
Blumer et al.

(10) Patent No.: US 8,423,239 B2
(45) Date of Patent: Apr. 16, 2013

(54) METHOD AND SYSTEM FOR ADJUSTING A CHARGE RELATED TO USE OF A VEHICLE DURING A PERIOD BASED ON OPERATIONAL PERFORMANCE DATA

(75) Inventors: Frederick T. Blumer, Atlanta, GA (US); Eric C. Berkobin, Woodstock, GA (US); Randy Holmes, Atlanta, GA (US)

(73) Assignee: HTI IP, L.L.C., Atlanta, GA (US)

( * ) Notice: Subject to any disclaimer, the term of this patent is extended or adjusted under 35 U.S.C. 154(b) by 650 days.

(21) Appl. No.: 12/624,234

(22) Filed: Nov. 23, 2009

(65) Prior Publication Data

US 2011/0125363 A1 May 26, 2011

(51) Int. Cl.
*G06M 17/00* (2006.01)
(52) U.S. Cl.
USPC .......................................... 701/33.7; 701/33.4
(58) Field of Classification Search ........ 701/33.1–33.9, 701/117; 70/337, 377, 492; 340/928, 988
See application file for complete search history.

(56) References Cited

U.S. PATENT DOCUMENTS

2008/0319602 A1* 12/2008 McClellan et al. ............. 701/33

* cited by examiner

*Primary Examiner* — Thomas Black
*Assistant Examiner* — Luke Huynh
(74) *Attorney, Agent, or Firm* — John L. Doughty

(57) ABSTRACT

A software method controlling a computer device compares operational performance data collected and stored from a vehicle to a predetermined criterion and determines, based on the comparison, whether to adjust a baseline charge for usage of a vehicle during the period. The software may compare data corresponding to one, or more, different parameters to determine the charge adjustment, the parameters including average MPG, engine revolutions, revolution-minutes, or fuel used during the period. The software method may use average values for MPG for the particular vehicle obtained prepared by a governmental agency. The method may also use criterion derived from governmental information. Or, the criterion may be a predetermined value based on a business consideration, such as number of engine revolutions corresponding to a given number of miles traveled. If the vehicle's engine turns more than the predetermined number during a period, the charge corresponding to use during period is increased.

14 Claims, 5 Drawing Sheets

METHOD AND SYSTEM FOR ADJUSTING A CHARGE RELATED TO USE OF A VEHICLE DURING A PERIOD BASED ON OPERATIONAL PERFORMANCE DATA

CROSS REFERENCE TO RELATED APPLICATIONS

This application claims priority under 35 U.S.C. §119(e) to U.S. Provisional Patent Application No. 61/117,014 entitled "Method and system for making use based business decisions based on vehicle performance information" to Blumer, el. al, filed on Nov. 21, 2008.

BACKGROUND

In addition to vehicle weight, engine size, tire characteristics, etc., vehicle miles per gallon ("MPG") is commonly understood to be impacted by certain driver behavior and road characteristics. These behavior and road characteristics place operational demands on a vehicle during operation, and may include:
  Speed
  Aggressive acceleration
  Aggressive braking
  Road type (e.g. city, highway, rural, interstate, traffic)
  Stops and starts However, acquiring and controlling data corresponding to these characteristics may raise privacy concerns. In addition, knowledge of these data to may mislead an interested party, such as an insurance company, vehicle rental company, employer, or parent, if a user operates a monitored vehicle one of these parameters occasionally outside of predetermined criteria during a period.

Thus, a need exists for a method and system for automatically acquiring, recording, processing and evaluating a driver's usage of his, or her, vehicle, both is quantitatively and qualitatively, to provide more accurate usage-based services based on a simple metric related to demands placed on a vehicle, without raising privacy concerns.

DESCRIPTION

Methods, systems, and apparatuses can utilize GPS capabilities and two-way in-vehicle data communications, typically wireless, between an in car device and a telematics operations center ("TOC"). The methods, systems, and apparatuses may enable various navigation solutions. The methods, systems, and apparatuses can comprise on-board navigation, off-board navigation, and/or a hybrid navigation approach. On-board navigation can comprise systems that store map data, location data, and can determine routing information in an apparatus installed in a vehicle or handheld. Off-board navigation can comprise systems wherein map data, location data, and routing determination capability is on a remote server, which may forward map data, location data, and determined routes toward an apparatus installed in a vehicle or handheld portable device. A hybrid navigation system can comprise systems that store map and location data on an apparatus installed in a vehicle device, or handheld device, with updates to the map and location data provided by a remote server. In a hybrid navigation system, routing can be performed on the vehicle apparatus, or at the remote server. In one aspect, an apparatus comprising a telematics control unit ("TCU") is installed in a vehicle. Such a vehicle may include, but is not limited to, personal and commercial automobiles, motorcycles, transport vehicles, watercraft, aircraft, and the like. For example, an entire fleet of a vehicle manufacturer's vehicles can be equipped with a TCU 101 shown in FIG. 1. TCU 101 can perform any of the methods disclosed herein in part and/or in their entireties.

A single box, or enclosure, may contain components of TCU 101, including a single core processing subsystem, or can comprise components distributed throughout a vehicle. Components of the apparatus can be separate subsystems of the vehicle; for example, a communications component such as a SDARS, or other satellite receiver, can be coupled with an entertainment system of the vehicle.

Figure 1:
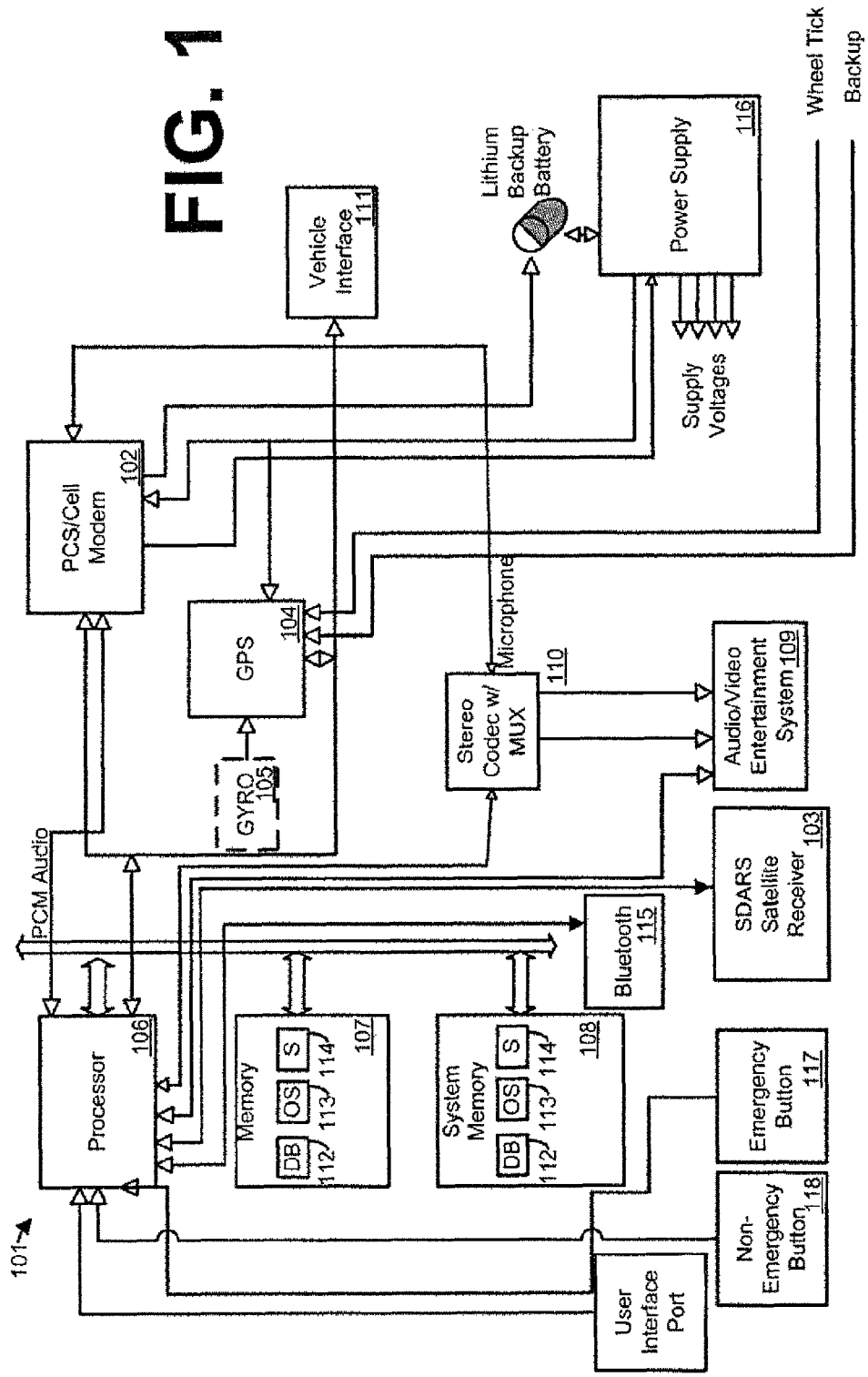
FIG. 1 Illustrates a schematic block diagram of an exemplary apparatus.

FIG. 1 illustrates an example of TCU 101, but does not suggest any limitation as to the scope of use or functionality of operating architecture. Neither should the TCU apparatus be necessarily interpreted as having any dependency or requirement relating to any one or combination of components illustrated in the exemplary apparatus. TCU apparatus 101 can comprise one or more communications components. Apparatus 101 illustrates communications components (modules) PCS/Cell modem 102 and SDARS receiver 103. These components can be referred to as vehicle mounted transceivers when located in a vehicle. PCS/Cell Modem 102 can operate on any frequency available in the country of operation, including, but not limited to, the 850/1900 MHz cellular and PCS frequency allocations. The type of communication can include, but is not limited to GPRS, GSM, EDGE, UMTS, 1xRTT or EV-DO. The PCS/Cell modem 102 can be a Wi-Fi or mobile WIMAX implementation that can support operation on both licensed and unlicensed wireless frequencies. Apparatus 101 can comprise an SDARS receiver 103 or other satellite receiver. SDARS receiver 103 can utilize high powered satellites operating at, for example, 2.35 GHz to broadcast digital content to automobiles and some terrestrial receivers, generally demodulated for audio content, but can contain digital data streams.

PCS/Cell Modem 102 and SDARS receiver 103 can be used to update an onboard database 112 contained within, or coupled to, apparatus 101. TCU apparatus 101 can request updating, or updating can occur automatically. For example, database updates can be performed using FM subcarrier, cellular data download, other satellite technologies, Wi-Fi and the like. SDARS data downloads can provide the most flexibility and lowest cost by pulling digital data from an existing receiver that exists for entertainment purposes. An SDARS data stream is not a channelized implementation (like AM or FM radio) but a broadband to implementation that provides a single data stream that is separated into useful and applicable components.

GPS receiver 104 can receive position information from a constellation of satellites operated by the U.S. Department of Defense. Alternatively GPS receiver 104 can be a GLONASS receiver operated by the Russian Federation Ministry of Defense, or any other positioning device capable of providing accurate location information (for example, LORAN, inertial navigation, and the like). GPS receiver 104 can contain additional logic, either software, hardware or both to receive the Wide Area Augmentation System (WAAS) signals, operated by the Federal Aviation Administration, to correct dithering errors and provide the most accurate location possible. Overall accuracy of the positioning equipment subsystem containing WAAS is generally in the two meter range. Optionally, apparatus 101 can comprise a MEMS gyro 105 for measuring angular rates and wheel tick inputs for determining the exact position based on dead-reckoning techniques. This functionality is useful for determining accurate locations in metropolitan urban canyons, heavily tree-lined streets, and tunnels.

In an aspect, the GPS receiver 104 can activate on vehicle crank-up, or start of vehicle motion. GPS receiver 104 can go into idle on ignition off, or after ten minutes without vehicle motion. Time to first fix can be <45 s 90% of the time. For example, this can be achieved either through chipset selection or periodic wake-up of a processor in TCU 101.

One or more processors 106 can control the various components of the apparatus 101. Processor 106 can be coupled to removable/non-removable, volatile/non-volatile computer storage media. By way of example, FIG. 1 illustrates memory 107, coupled to the processor 106, which can provide non-volatile storage of computer code, computer readable instructions, data structures, program modules, and other data for the computer 101. For example and not meant to be limiting, memory 107 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like. Data obtained and/or determined by processor 106 can be displayed to a vehicle occupant and/or transmitted to a remote processing center. This transmission can occur over a wired or a wireless network. For example, the transmission can utilize PCS/Cell Modem 102 to transmit the data over a cellular communication network. The data can be routed through the Internet where it can be accessed, displayed and manipulated.

Processing by the disclosed systems and methods can be performed under the control of software components. The disclosed system and method can be described in the general context of computer-executable instructions, such as program modules, being executed by one or more computers or other devices. Generally, program modules comprise computer code, routines, programs, objects, components, data structures, etc. that perform particular tasks; or implement, or manipulate, particular abstract data types. The disclosed method can also be practiced in grid-based and distributed computing environments where tasks are performed by remote processing devices that are linked through a communications network. In a distributed computing environment, program modules can be located to in both local and remote computer storage media including memory storage devices.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

Any number of program modules can be stored in memory 107, including by way of example, an operating system 113 and reporting software 114. Each of the operating system 113 and reporting software 114 (or some combination thereof) can comprise elements of the programming and the reporting software 114. Data can also be stored on the memory 107 in database 112. Database 112 can be any of one or more databases known in the art. Examples of such databases comprise, DB2®, Microsoft® Access, Microsoft® SQL Server, Oracle®, mySQL, PostgreSQL, and the like, or any other, way, or format, for storing data and information for later retrieval. Database 112 can be centralized, or distributed across multiple systems.

In some aspects, data can be stored and transmitted in loss-less compressed form and the data can be tamper-proof. Non-limiting examples of data that can be collected follow herein. After a connection is established the protocol being used can be stored. A timestamp can be recorded on ignition for one or more trips. Speed every second during the trip. Crash events can be stored (for example, as to approximated via OBD II speed). By way of example, GPS related data that can be recorded during one or more trips can comprise one or more of, time, latitude, longitude, altitude, speed, heading, horizontal dilution of precision (HDOP), number of satellites locked, and the like. In one aspect, recorded data can be transmitted from the apparatus to a back-office for integrity verification and then via, for example, a cellular network. Once validated, data can be pushed to a company via established web-services & protocols.

By way of example, the operating system 113 can be a Linux (Unix-like) operating system. One feature of Linux is that it includes a set of "C" programming language functions referred to as "NDBM". NDBM is an API for maintaining key/content pairs in a database which allows for quick access to relatively static information. NDBM functions use a simple hashing function to allow a programmer to store keys and data in data tables and rapidly retrieve them based upon the assigned key. A major consideration for an NDBM database is that it only stores simple data elements (bytes) and requires unique keys to address each entry in the database. NDBM functions provide a solution that is among the fastest and most scalable for small processors.

Such programs and components may reside at various times in different storage components of the apparatus 101, and may be executed by the processor 106 of apparatus 101. An implementation of reporting software 114 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by a computer.

FIG. 1 illustrates system memory 108, coupled to the processor 106, which can comprise computer readable media in the form of volatile memory, such as random access memory (RAM, SDRAM, and the like), and/or non-volatile memory, such as read only memory (ROM). The system memory 108 typically contains data and/or program modules such as operating system 113 and reporting software 114 that are immediately accessible to and/or are presently operated on by the processor 106. The operating system 113 can comprise a specialized task dispatcher, slicing available bandwidth among the necessary tasks at hand, including communications management, position determination and management, entertainment radio management, SDARS data demodulation and assessment, power control, and vehicle communications.

The processor 106 can control additional components within the apparatus 101 to allow for ease of integration into vehicle systems. The processor 106 can control power to the components within the apparatus 101, for example, shutting off GPS receiver 104 and SDARS receiver 103 when the vehicle is inactive, and alternately shutting off the PCS/Cell Modem 102 to conserve the vehicle battery to when the vehicle is stationary for long periods of inactivity. The processor 106 can also control an audio/video entertainment subsystem 109 and comprise a stereo codec and multiplexer 110 for providing entertainment audio and video to the vehicle occupants, for providing wireless communications audio (PCS/Cell phone audio), speech recognition from the driver compartment for manipulating the SDARS receiver 103 and PCS/Cell Modem 102 phone dialing, and text to speech and pre-recorded audio for vehicle status annunciation.

TCU apparatus 101 can interface and monitor various vehicle systems and sensors to determine vehicle conditions. Apparatus 101 can interface with a vehicle through a vehicle interface 111. The vehicle interface 111 can include, but is not limited to, OBD (On Board Diagnostics) port, OBD-II port, CAN (Controller Area Network) port, and the like. A cable can be used to connect the vehicle interface 111 and TCU 101. Any type of cable capable of connecting to a vehicle diagnostics port can be used. In one aspect, an OBD II connector cable can be used that follows the J1962 trapezoidal connector specification, the J1939 or J1708 round connector specifications, and the like. A communication protocol such as, J1850 PWM, J1850 VPW, ISO9141-2, ISO14230-4, and the like can be used to collect data through the vehicle interface 111. The vehicle interface 111, allows the apparatus 101 to receive data indicative of vehicle performance, such as vehicle trouble codes, operating temperatures, operating pressures, speed, engine revolutions per minute ("RPM"), fuel air mixtures, oil quality, oil and coolant temperatures, wiper and light usage, mileage, break pad conditions, and any other data obtained from any vehicle system, subsystem, or sensor, coupled with the TCU 101, such as over bus using CAN protocol, an ISO protocol, a keyword 2000 protocol, or a similar protocol for interfacing various sensors, modules, and computers in a vehicle with each other. Additionally, CAN interfacing can eliminate individual dedicated inputs to determine, for example, brake usage, backup status, and it can allow reading of onboard sensors in certain vehicle stability control modules providing gyro outputs, steering wheel position, accelerometer forces and the like for determining driving characteristics. TCU apparatus 101 can interface directly with, or in some cases include, a vehicle subsystem or a sensor, such as, for example, an accelerometer, gyroscope, airbag deployment computer, and the like. Data obtained from, and processed data derived from, the various vehicle systems and sensors can be transmitted to a central monitoring station via the PCS/Cell Modem 102 over a communication network.

Communication with a vehicle driver can be through an infotainment (radio) head unit (not shown), or other display device (also not shown). More than one display device can be used. Examples of display devices include, but are not limited to, a monitor, an LCD (Liquid Crystal Display), a projector, and the like. Audio/video entertainment subsystem 109 can comprise a radio receiver, FM, AM, Satellite, Digital and the like. Audio/video entertainment subsystem 109 can comprise one or more media players. An example of a media player includes, but is not limited to, audio cassettes, compact discs, DVD's, Blu-ray, HD-DVDs, Mini-Discs, flash memory, portable audio players, hard disks, game systems, and the like. Audio/video entertainment subsystem 109 can comprise a user interface for controlling various functions. The user interface can comprise buttons, dials, and/or switches. In certain embodiments, the user interface can comprise a display to screen. The display screen can be a touch screen. The display screen can be used to provide information about the particular entertainment being delivered to an occupant, including, but not limited to Radio Data System (RDS) information, ID3 tag information, video, and various control functionality (such as next, previous, pause, etc. . . . ), websites, and the like. Audio/video entertainment subsystem 109 can utilize wired or wireless techniques to communicate to various consumer electronics including, but not limited to, cellular phones, laptops, PDAs, portable audio players, and the like. Audio/video entertainment subsystem 109 can be controlled remotely through, for example, a wireless remote control, voice commands, and the like.

The methods, systems, and apparatuses disclosed herein can utilize power management techniques to ensuring that a consumer's, or motorist's, car battery is not impaired under normal operating conditions. This can include battery backup support when the vehicle is turned off in order to support various wake-up and keep-alive tasks. All data collected subsequent to the last acknowledged download can be maintained in non-volatile memory until the apparatus is reconnected to an external power source. At that point, the apparatus can self re-initialize and resume normal operation. Specific battery chemistry can optimize life/charge cycles. The battery can be rechargeable. The battery can be user replaceable or non-user replaceable.

TCU apparatus 101 can receive power from power supply 116. The power supply can have many unique features necessary for correct operation within the automotive environment. Operating in one mode, power supply 116 can supply a small amount of power (typically less than 100 microamps) to at least one master controller that can control all the other power buses inside of the TCU 101. In an exemplary system, a low power low dropout linear regulator supplies this power to PCS/Cellular modem 102. This provides the static power to maintain internal functions so that it can await external user push-button inputs or await CAN activity, for example, via vehicle interface 111. Upon receipt of an external stimulus via either a manual push button or CAN activity, the processor contained within the PCS/Cellular modem 102 can control the power supply 116 to activate other functions within TCU 101, such as GPS 104/GYRO 105, processor 106/memory 107 and 108, SDARS receiver 103, audio/video entertainment system 109, audio codec mux 110, and any other peripheral within the TCU that does not require standby power.

Processors in a TCU can have a plurality of power supply states. One state can be a state of full power and operation used when the vehicle is operating. Another state can be full power delivery from battery backup. Turning off the GPS and other non-communication related subsystem while operating on the back-up batteries can reduce backup power usage. Another state can be when the vehicle associated with TCU 101 has been shut off recently, perhaps within the last 30 days, and the TCU maintains communication over a two-way wireless network for various auxiliary services like remote door unlocking and location determination messages. After a recent shut down period, it is desirable to conserve charge in the vehicle's battery by turning off almost all power-using portions of TCU 101, except portions used to maintain system time of day clocks, and other functions waiting to be awakened on CAN activity. Additional power states are contemplated, such as a low power wakeup to check for network messages.

Normal operation can comprise, for example, the PCS/Cellular modem 102 waiting for an emergency pushbutton key-press from a user interface device, or for CAN activity. Once either is detected, the PCS/Cellular modem 102 can awaken and enable power supply 116. Similar operation can occur for a shutdown process wherein a first level shutdown process turns off everything except the PCS/Cellular modem 102, for example. The PCS/Cellular modem 102 can maintain wireless network contact during this state of operation. TCU 101 can operate normally in this state when the vehicle is turned off. If the vehicle is off for an extended period of time, perhaps over a vacation etc., the PCS/Cellular modem 102 can be dropped to a very low power state where it no longer maintains contact with the wireless network.

Additionally, in FIG. 1, subsystems can include a Blue-Tooth transceiver 115 that can facilitate interfacing with devices such as phones, headsets, music players, and telematics user interfaces. The apparatus can comprise one or more user inputs, such as emergency button 117 and non-emergency button 118. Emergency button 117 can be coupled to processor 106. The emergency button 117 can be located in a vehicle cockpit and activated by an occupant of the vehicle. Activation of emergency button 117 can cause processor 106 to initiate a voice and data connection from the vehicle to a central monitoring station, also referred to as a remote call center. Data such as GPS location and occupant personal information can be transmitted to the call center. The voice connection permits two way voice communication between a vehicle occupant and a call center operator. The call center operator can have local emergency responders dispatched to the vehicle based on the data received. In another embodiment, the connections are made from the vehicle to an emergency responder center.

One or more non-emergency buttons 118 can be coupled to processor 106. Non-emergency buttons 118 can be located in a vehicle cockpit and activated by an occupant of the vehicle. Activation of the one or more non-emergency buttons 118 can cause processor 106 to initiate a voice and data connection from the vehicle to a remote call center. Data such as GPS location and occupant personal information can be transmitted to the call center; a TOC can use this information to retrieve vehicle and motorist information, such as drug allergies or other medical issues particular to a given motorist. The voice connection permits two way voice communications between a vehicle occupant and a call center operator. The call center operator, such as a operator working for a telematics services provider, or working for a roadside assistance operator, can provide location based services to the vehicle occupant based on the data received and the vehicle occupant's desires, as well as the needs of a service provider. For example, a button can provide a vehicle occupant with a link to roadside assistance services such as towing, spare tire changing, refueling, and the like, either directly or through an intermediary call center, such as a telematics services provider or a membership-based roadside assistance provider. In another embodiment, a button can provide a vehicle occupant with concierge-type services, such as details regarding local restaurants, their locations, and contact information; details regarding local providers of various services, their locations, and their contact information; travel related information such as flight and train schedules; and the like.

For any voice communication made through TCU 101, text-to-speech algorithms can be used so as to convey predetermined messages in addition to or in place of a vehicle occupant speaking. This allows for communication when the vehicle occupant is unable or unwilling to communicate vocally.

In an aspect, apparatus 101 can be coupled to a telematics user interface located remote from the apparatus. For example, the telematics user interface can be located in the cockpit of a vehicle in view of vehicle occupants while the apparatus 101 is located under the dashboard, behind a kick panel, in the engine compartment, in the trunk, or generally out of sight of vehicle occupants.

Figure 2:
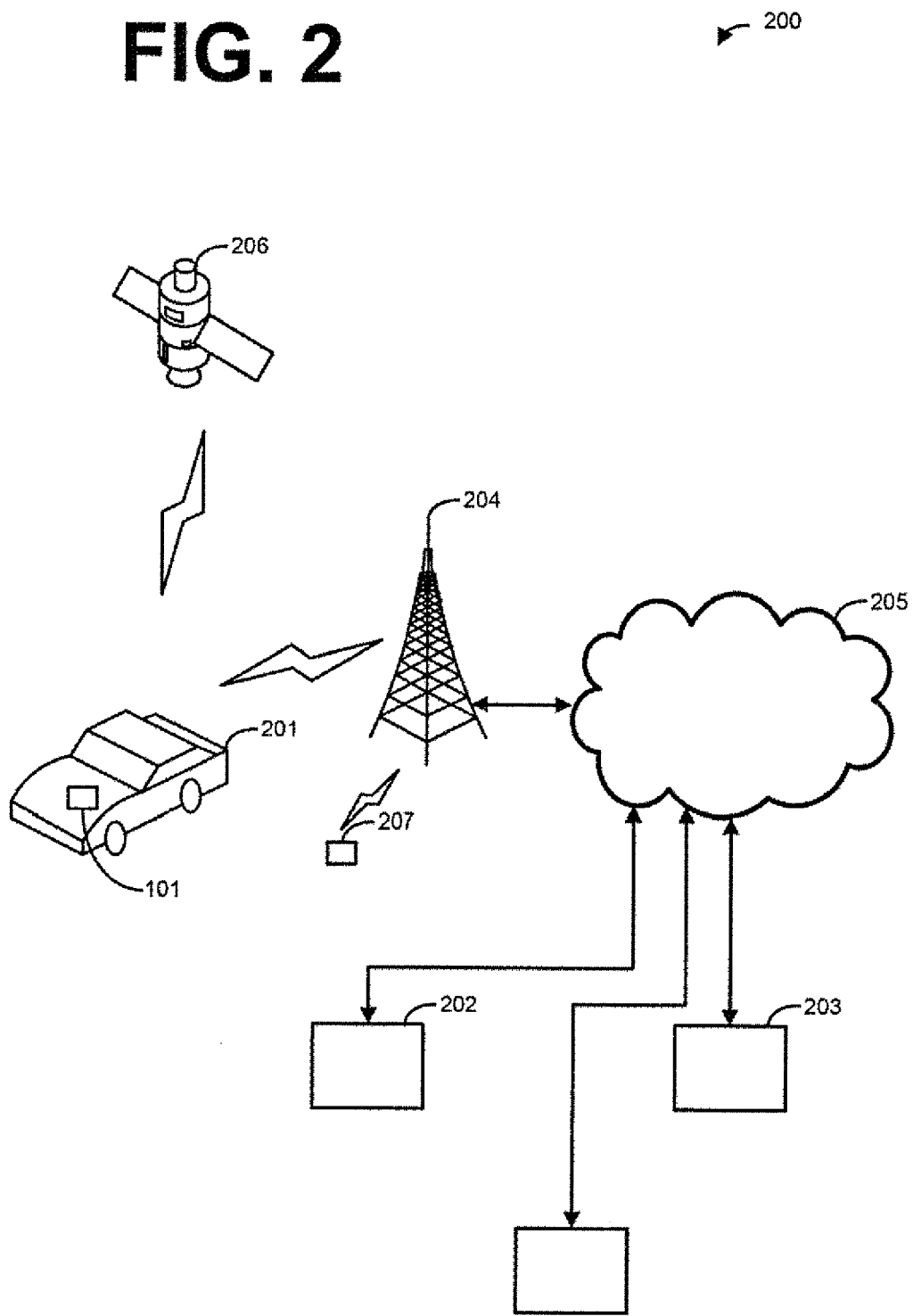
FIG. 2 Illustrates an exemplary system.

FIG. 2 is a block diagram illustrating an exemplary telematics system 200 showing network connectivity between various components. System 200 can comprise a TCU 101 located in a motor vehicle 201 and a mobile communication device 207. Mobile communication device can be a pager, a device having cellular phone circuitry, a PDA, a laptop, and the like. System 200 can comprise a central monitoring station computer server 202. The central monitoring station computer 202 can serve as a market specific data gatekeeper. That is, users 203 can pull information from specific, multiple, or almost all markets at any given time for immediate analysis. The distributed computing model has no single point of complete system failure, thus minimizing downtime of system 200. In an embodiment, central monitoring station 202 can communicate through an existing communications network (e.g., wireless towers 204 and communications network 205) with the TCU 101 and the mobile communication device 207. In another embodiment, TCU 101 can communicate directly with the mobile communication device 207. System 200 can comprise at least one satellite 206 from which GPS data are determined. These signals can be received by a GPS receiver in the vehicle 201. Station 202 can also include servers for providing telematics services, and for storing telematics-related customer and vehicle information.

System 200 can comprise a plurality of users 203 (governments, corporations, individuals, and the like) which can access the system using a computer, or other computing device, running a commercially available Web browser or client software. For simplicity, FIG. 2 shows only one user 203. Users 203 can connect to the telematics navigation system 200 via the communications network 205. In an embodiment, communications network 205 can comprise the Internet.

Telematics system 200 can comprise a central monitoring station 202 which can comprise one or more central monitoring station servers. In some aspects, one or more central monitoring station servers can serve as the "back-bone" (i.e., system processing) of system 200. One skilled in the art will appreciate that telematics system 200 can utilize servers (and databases) physically located on one or more computers and at one or more locations. Central monitoring station server can comprise software code logic that is responsible for handling tasks such as route determination, traffic analysis, map data storage, location data storage, POI data storage, data interpretations, statistics processing, data preparation and compression for output to TCU 101, and interactive route planning, location and POI searching, and the like, for output to users 203. In an embodiment, user 203 can host a server (also referred to as a remote host) that can perform similar functions as a central monitoring station server. In an embodiment of telematics system 200, central monitoring station servers and/or remote host servers, can have access to a repository database which can be a central store for a portion of or all information within telematics system 200 (e.g., executable code, map, location, POI information, subscriber information such as login names, passwords, etc., and vehicle and demographics related data).

In an aspect, central monitoring station 202 can provide updates to TCU 101 including, but not limited to, map updates, POI updates, routing software updates, and the like.

Central monitoring station servers and/or a remote host server can also provide a "front-end" for telematics system 200. That is, a central monitoring station server can comprise a web server for providing a web site which sends out web pages in response to requests from remote browsers (i.e., users 203, or customers of users 203). More specifically, a central monitoring station computer server and/or a remote host server can provide a graphical user interface (GUI) "front-end" to users 203 of the telematics navigation system 200 in the form of Web pages. These Web pages, when sent to the user PC (or the like), can result in GUI screens being displayed.

Figure 3:
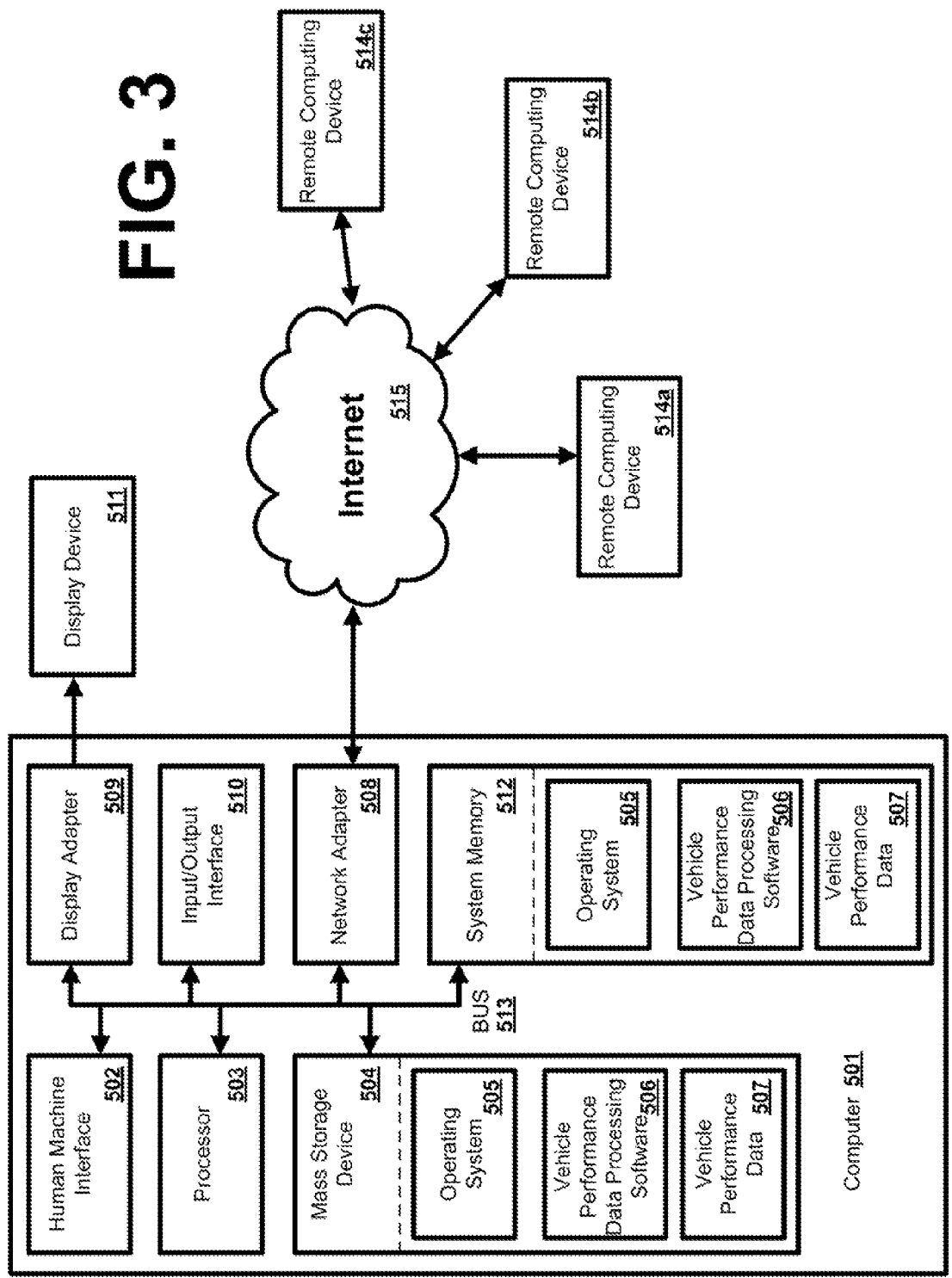
FIG. 3 Illustrates an exemplary operating environment for disclosed methods.

FIG. 3 is a block diagram illustrating an exemplary operating environment for performing the disclosed methods, for example, a server, or other computing device, at a remote host or a central monitoring station. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

In another aspect, the methods and systems can be described in the general context of computer instructions, such as program modules, being executed by a computer. Generally, program modules comprise routines, programs, objects, components, data structures, etc. that perform particular tasks or implement particular abstract data types. The methods and systems can also be practiced in distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 501. The components of computer 501 can comprise, but are not limited to, one or more processors or processing units 503, a system memory 512, and a system bus 513 that couples various system components including the processor 503 to the system memory 512. The claimed systems and methods may be carried out by a computer either at TCU 101 or central computer 202.

The system bus 513 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI) bus, PCI-Express bus, Universal Serial Bus (USB), and the like. The bus 513, and all buses specified in this description can also be implemented over a wired or wireless network connection and each of the subsystems, including the processor 503, a mass storage device 504, an operating system 505, navigation and vehicle performance software 506, navigation and vehicle performance data 507, a network adapter (or communications interface) 508, system memory 512, an Input/Output Interface 510, a display adapter 509, a display device 511, and a human machine interface 502, can be contained within one or more remote computing devices 514*a,b,c* at physically separate locations, connected through buses of this form, in effect implementing a fully distributed system. In one aspect, a remote computing device can be a TCU.

The computer 501 typically comprises a variety of computer readable media. Exemplary readable media can be any available media that is accessible by the computer 501 and comprises, for example and not meant to be limiting, both volatile and non-volatile media, removable and non-removable media. The system memory 512 comprises computer readable media in the form of volatile memory, such as random access memory (RAM), and/or non-volatile memory, such as read only memory (ROM). The system memory 512 typically contains data such as navigation data 507 and/or program modules such as operating system 505 and navigation software 506 that are immediately accessible to and/or are presently operated on by the processing unit 503. Navigation data 507 can comprise any data generated by, generated for, received from, or sent to TCU 101.

In another aspect, the computer 501 can also comprise other removable/non-removable, volatile/non-volatile computer storage media. By way of example, FIG. 3 illustrates a mass storage device 504 which can provide non-volatile storage of computer code, computer readable instructions, data structures, program modules, and other data for the computer 501. For example and not meant to be limiting, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 504, including by way of example, an operating system 505 and navigation software 506. Each of the operating system 505 and navigation software 506 (or some combination thereof) can comprise elements of the programming and the navigation software 506. Navigation data 507 can also be stored on the mass storage device 504. Navigation data 507 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 501 via an input device (not shown). Examples of such input devices comprise, but are not limited to, a keyboard, pointing device (e.g., a "mouse"), a micro-phone, a joystick, a scanner, tactile input devices such as gloves, and other body coverings, and the like These and other input devices can be connected to the processing unit 503 via a human machine interface 502 that is coupled to the system bus 513, but can be connected by other interface and bus structures, such as a parallel port, game port, an IEEE 1394 Port (also known as a Firewire port), a serial port, or a universal serial bus (USB).

In yet another aspect, a display device 511 can also be connected to the system bus 513 via an interface, such as a display adapter 509. It is contemplated that the computer 501 can have more than one display adapter 509 and the computer 501 can have more than one display device 511. For example, a display device can be a monitor, an LCD (Liquid Crystal Display), or a projector. In addition to the display device 511, other output peripheral devices can comprise components such as speakers (not shown) and a printer (not shown) which can be connected to the computer 501 via Input/Output Interface 510. Any step and/or result of the methods can be output in any form to an output device. Such output can be any form of visual representation, including, but not limited to, textual, graphical, animation, audio, tactile, and the like.

The computer 501 can operate in a networked environment using logical connections to one or more remote computing devices 514*a,b,c*. By way of example, a remote computing device can be a personal computer, portable computer, a server, a router, a network computer, a TCU, a PDA, a cellular phone, a "smart" phone, a wireless communications enabled key fob, a peer device or other common network node, and so on. Logical connections between the computer 501 and a remote computing device 514*a,b,c* can be made via a local area network (LAN) and a general wide area network (WAN). Such network connections can be through a network adapter 508. A network adapter 508 can be implemented in both wired and wireless environments. Such networking environments are conventional and commonplace in offices, enterprise-wide computer networks, intranets, and the Internet 515. In one aspect, the remote computing device 514*a,b,c* can be one or more TCUs 101.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of navigation software 506 can be stored on or transmitted across some form of computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The processing and performing of the disclosed methods and systems can be performed by computer hardware components under the control of computer software components. One skilled in the art will understand that reference to a method performing a step also refers to hardware performing the step of the method, the hardware typically configured to run a software program that controls operation of it. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

As used herein in the method descriptions that follow, in certain embodiments, "in-vehicle system" can comprise a system that is installed in a vehicle, either at a factory, dealer, or by the user. In other embodiments, "in-vehicle system" can comprise components and systems that can be used outside of a vehicle. In various embodiments, the in-vehicle system can comprise a telematics device, a navigation system an infotainment system, combinations thereof, and the like. The "remote host" can be a central monitoring station, or other host, that maintains computing and communications systems configured for carrying out the methods.

Using data corresponding to operational performance demand metrics as factors in adjusting a charge corresponding to usage of a vehicle generates multiple benefits. For example, using miles per gallon of fuel ("MPG"), engine revolutions per minute ("RPM"), engine revolution-minutes, or raw number of engine revolutions during a period, as one, or more, factors in determining insurance ratings provides a basis that preserves privacy of an automobile driver while also providing a simple metric for adjusting a charge for use of the automobile during the period. Since an average MPG over a period does not reveal particular, discrete, indicia of driving behavior, i.e., missing a turn and driving in a dangerous area, or occasionally accelerating rapidly to avoid traffic hazards, using average MPG preserves privacy. Otherwise, an insurance company could base an increase in premium on driving location and rapid acceleration, presuming these discrete and occasional occurrences as 'risky' behavior. In addition, compiling and comparing data corresponding to multiple metrics can impose an administrative and processing burden on personnel and computers.

Conversely, providing adjustments to a charge, either upwardly, or downwardly, based on a single metric, MPG, engine revolutions, RPM, or revolution-minutes, for example, can results in an accurate assessment of the 'riskiness' of someone's driving behavior. As discussed above, when a driver accelerates rapidly, the vehicle either automatically shifts, or the driver shifts, into a lower gear. This facilitates greater force reaching the driven wheels from the engine. However, rapid acceleration of a vehicle consumes a large amount of fuel for a given distance traveled, compared to steady-state driving. A vehicle typically also consumes more fuel in mountainous terrain, thus obtaining a lower, or less desirable, MPG than driving on flat terrain. This lower MPG correlates with more risky driving conditions because visibility is typically lower on roads in mountainous due to their curvy and undulating nature. As another example, continuing to apply throttle until the last moment while approaching a traffic light, or stop sign, rather than letting off the throttle and coasting to a stop, also uses more fuel. This lower MPG also corresponds to risky driving behavior, i.e., more braking and less stopping distance. These three example show how without knowing where, or how fast a driver drives, one can view average MPG for a given vehicle as a proxy for driving behavior—lower average MPG indicates riskier behavior and a higher average MPG indicates a safer driver.

In addition, the smaller a vehicle the better the MPG a driver can typically achieve. Based on an assumption that drivers who tend to exhibit less-risky driving behavior also tend to purchase and drive smaller, less-flashy, more economical vehicles, a higher MPG rating for a given vehicle should indicate less risky driving than for a driver who drives a vehicle with a lower MPG rating.

One embodiment of using MPG, or other operational performance data, as a basis for adjusting a charge related to usage of a vehicle, such as for computing an adjustment to an insurance rate, would be to use an MPG rating calculated by the EPA for a particular vehicle type as a criterion for comparison with operational performance data collected from, or derived from data collected from, a vehicle's TCU. The operational performance data may correspond to certain parameters, or the operational data may be processed to correspond to certain parameters. The operational performance data, or derived data, may indicate performance demands placed on a vehicle. Such operational performance data may include miles per gallon of fuel vehicle speed, vehicle acceleration, vehicle braking (deceleration), engine revolutions, engine revolution-minutes (or hours, or other predetermined period), or engine revolutions-per-minute.

The TOC, or TCU may, for example, retrieve a vehicle's corresponding rated fuel mileage from a centrally located database over the interne based on the vehicle's VIN (vehicle identification number). A telematics services provider, which typically operates a TOC, could compare information received from a given TCU and compare it with the retrieved. MPG rating that corresponds to the vehicle. Then, the TOC could forward the results of the comparison to an interested entity, such as, for example, an insurance company or a vehicle rental company.

Another predetermined parameter that one could compare to data acquired with a TCU, for example, could include statistics that indicate a generally accepted number of engine revolution-minutes, or raw number of engine revolutions during a period, for the vehicle. This could replace the prevalent use by insurance companies of number of miles driven as a basis for adjustments to a charge. A comparison of a revolution criterion to actual revolutions in a period may predict whether a driver's behavior warrants a decrease or increase to an insurance premium better than a mileage criterion does.

Although a higher number of revolutions generally corresponds to a higher number of miles driven, more aggressive driving would also increase the number of revolutions in a given period as discussed above with respect to rapid acceleration and braking. Thus, not only does the number of engine revolutions in a period, for example a month, indicate more driving, but also that the driver has driven more aggressively. Solely using mileage during a period as a criteria does not account for aggressive driving, mountainous driving, or other scenarios such as a high percentage of total driving in urban areas.

For example, an insurance company could first determine a driver's baseline insurance rate. The insurance company would also predetermine baseline values for factors that could include MPG, RPM, revolution-minutes, or engine revolutions during a given period. The business could then make recurring business decisions, for example periodically adjust insurance rates, based on a driver's actual deviation, if any, from the predetermined baseline values of one, or more, of the factors.

A telematics device coupled to a vehicle's onboard computer and diagnostic system, preferably via a port, such as, for example, an On Board Diagnostics II ("OBD II") port, samples data from selected sensors and transmits the data wirelessly to a remote central server coupled to a communications network such as an interne protocol network, for example the world wide web. The central server is typically operated by a telematics services provider. The telematics services provider may analyze the received data and determine an adjustment to a charge for a business entity, such as an insurance company or a vehicle leasing company, based on the analysis. The telematics services provider may even generate and provide an adjusted bill that includes the adjusted charge for the use related to a given vehicle.

Alternatively, the telematics services provider may forward operational performance data received from a vehicle to a remote server operated by a business entity, that may then adjust its customer's charge related to use of a vehicle based on information received from the telematics services provider's central server. The business entity processes the data corresponding to the vehicle and makes business decisions based on the processed data. For example, a business entity, such as an insurance company, could evaluate the processed data and determine that the vehicle's actual average MPG over a given period (typically a month) exceeds the predetermined, and generally accepted average MPG value for the vehicle (perhaps a governmental entity, or an industry organization, provides the standard MPG for a given vehicle with given installed equipment). Then the insurance company could adjust the driver's insurance premium to a lower amount in correlation with the higher MPG amount achieved during the previous month.

The business entity could automatically calculate the revised monthly premium amount and transmit a notification and statement of the lower, or higher, amount electronically to the insured's e-mail address, the insured's telephone number as an SMS message, or to an account with a telematics services provider that has been associated with the insured's insurance provider.

An entity could also compare data related to parameters other than MPG, as discussed above, with a corresponding generally accepted predetermined baseline value. For example, raw number of engine revolutions during a period can indicate driving style and magnitude. Generally, a higher number of revolutions per month indicates a higher number of miles driven. Moreover, for a given number of miles driven during a period, a higher number of revolutions would tend to correlate with higher acceleration rates from a standing stop, more overtaking and passing of vehicles traveling in the same direction as the driver, or a mix of driving conditions weighted more heavily toward city driving than highway driving. These driving scenarios result in more engine revolutions because a driver typically uses a lower gear when accelerating from a stop, when passing, or during city driving, as compared to steady state highway driving. Thus, if the number of engine revolutions over a given period exceeds a predetermined amount, an insurance company could raise its customer's premium for the month. On the other hand, if the engine in the customer's vehicle turns fewer revolutions than a predetermined baseline value over a month, the insurance company could reduce the driver's premium for the next month.

The insurance company could also provide, via its web site, or via the customer's telematics services provider's web site, an interface for using a credit for a month when the insured drove more than a normal amount—the insured could claim the credit against a future month if the insured anticipates lower than normal driving in the future month. For example, if the driver exceeds the average revolutions for a month period, instead of paying a higher premium the following month, the driver could choose, via a web site interface, to shift the engine revolution overage to a month in the future. Although this would prevent an increased premium for the current month, it would reduce the predetermined baseline revolutions criterion for the future month. If the insurance company 'credits' the upcoming month's premium by shifting the revolutions overage from a current month to a future month, and the driver exceeds the reduced amount of revolutions in the selected future month, then the insurance company could charge not only the increase that it forwent, but also a surcharge. Thus, the insurance company has a way to charge premiums that reflect usage, as well as driver behavior, and the driver has control of his, or her, premium if they need to drive a higher amount in one month, but can drive an amount lower than average another month.

Figure 4:
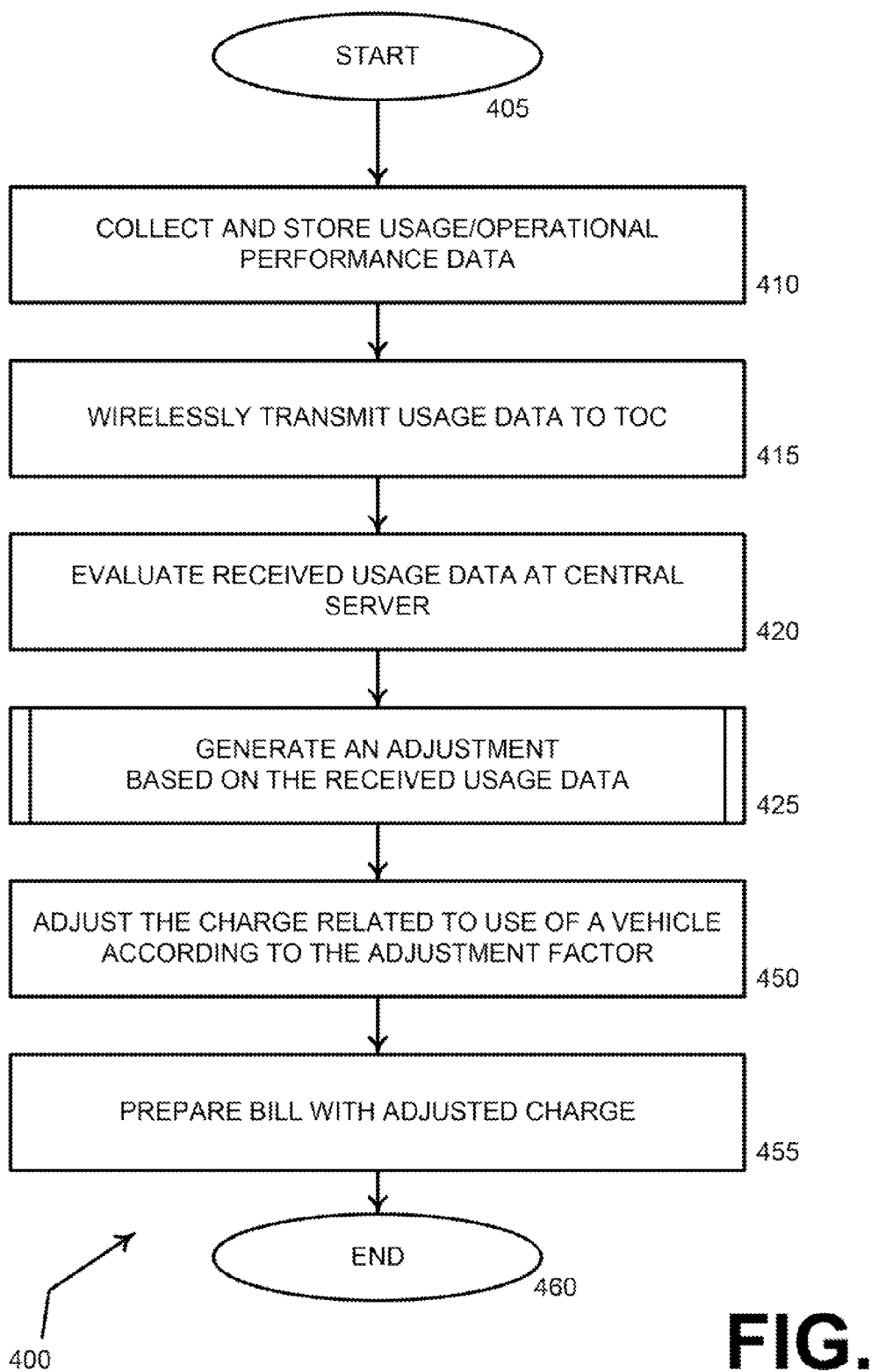
FIG. 4 illustrates a flow diagram of a method for generating a charge corresponding to use of a vehicle.

Turning now to FIG. 4, the figure illustrates a flow diagram of a method 400 for generating a charge corresponding to use of a vehicle. Method 400 starts at step 405. At step 410, a data acquisition device (e.g. a TCU, or other device that can collect, process, and transmit diagnostic and performance data retrieved from a vehicle's onboard computer system) in the vehicle collects data from the vehicle's on board computer system and stores the data to a first memory portion coupled to the data acquisition device. The data may include information read directly from various sensors onboard the vehicle, or the TCU may derive information from directly-read sensor information. The TCU may derive information, such as, for example, miles per gallon ("MPG") based on a fuel level in the vehicle's fuel tank and odometer (or other calculation of mileage) values corresponding to the fuel levels. Alternatively, the TCU may receive data from a vehicle's sensors and transmit the data towards a central computer that stores the received information in a first memory portion coupled to it, that derives MPG therefrom, and that stores the derived information to either the first memory portion, or another memory portion.

At step 415, the TCU wirelessly transmits the calculated MPG, or other operational performance data, or data that the central computer can use to calculate MPG, or other operational performance information. One skilled in the art will appreciate that a central computer typically couples to, and is part of, a communication network, such as, for example, the world wide web, or other internetworking network. Also, the central computer may couple, via a network, to a telecommunication link, such as a wireless link, a cable TV link, a satellite link, a T1 link, or a DSL link.

At step 420, the TCU evaluates data it collects, or a central computer evaluates data it receives from the TCU, and determines whether the MPG, or other operational performance information corresponding to the vehicle, falls outside of predetermined criteria. If the TCU only transmitted fuel level and corresponding distance traveled, the central computer would typically first compute MPG before evaluating the collected, or derived, data against predetermined criteria.

If the central computer determines at step 425 that the MPG for the vehicle falls outside the predetermined criteria, at step 450 the central computer either adjusts a charge corresponding to vehicle usage, or forwards, over a communication network, the MPG information to a different computer. Typically a telematics service provider operates central computer 202, as shown in FIG. 2. A telematics services provider may refer to central computer 202 as a telematics operations center computer ("TOC"). If the TOC computer performs the steps of determining whether the MPG for the vehicle falls outside predetermined criteria, the TOC may also adjust a charge in connection with usage of a vehicle, and send an invoice for the adjusted charge, either electronically or via paper document. Alternatively, an insurance company's computer, or a vehicle rental company's computer, may receive information forwarded from the TOC and then determine an adjustment to a charge rather than have the telematics services provider perform the evaluating and adjusting steps of a 420 and 425."

At step 455 the telematics services provider may prepare and send the use-related charge to an entity interested in vehicle usage, such as, for example, an insurance company, a rental car company, a company administering a lease of the vehicle, or a company that adjusts payments to employees based on their driving style and amount of driving performed in a period. In the latter of these examples, a charge for use of a vehicle may not be subject to adjustment, but the telematics services provider might determine, for an employer, an adjustment to an employee's paycheck based on his, or her, MPG performance, or just RPM or revolutions, during a given pay period. The TOC would then forward the determined adjustment to the employee's employer for application to the employee's pay. Method 400 ends at step 460.

Figure 5:
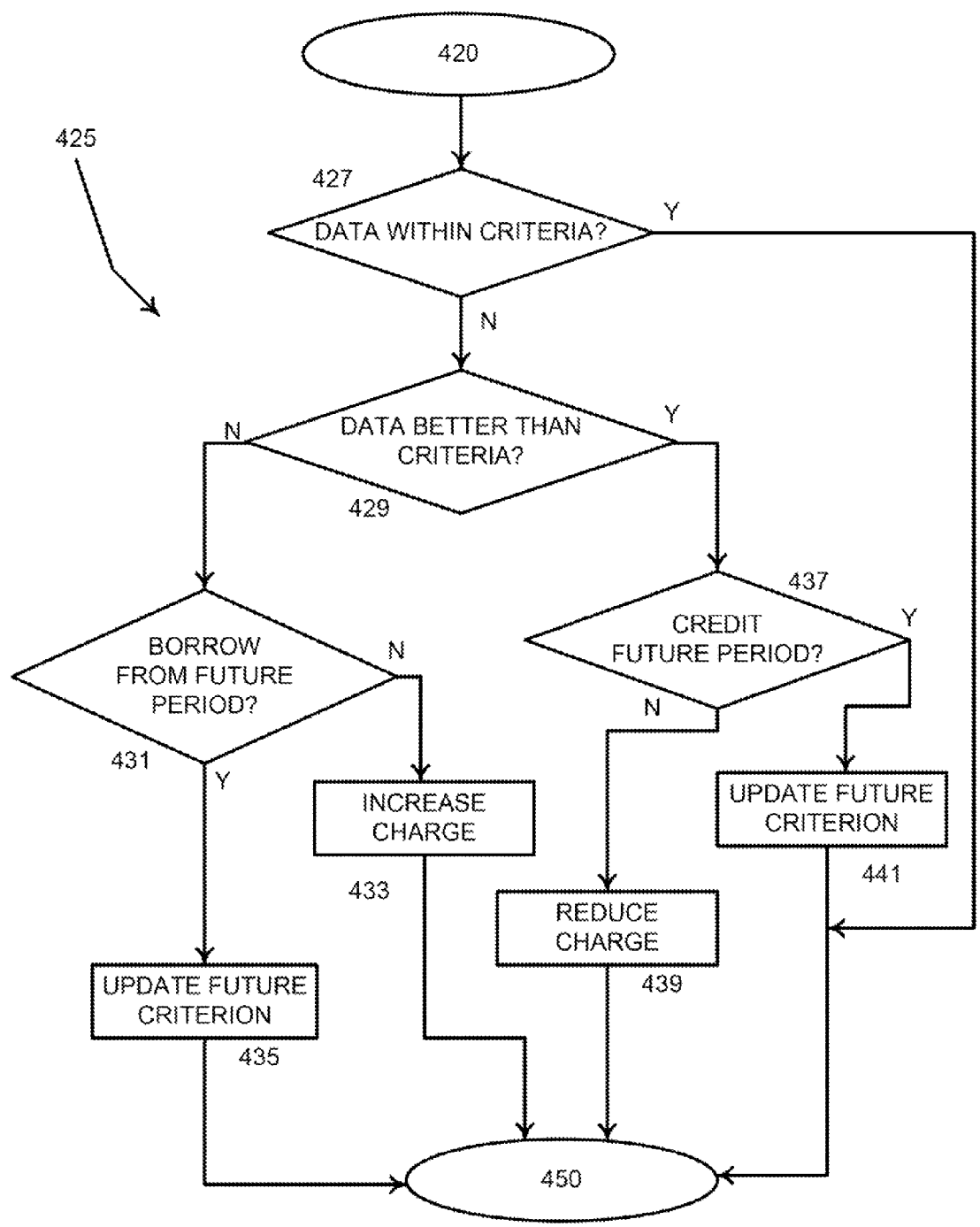
FIG. 5 illustrates a flow diagram of a method for generating a charge adjustment to be applied to a charge corresponding to use of a vehicle.

Turning now to FIG. 5, the figure illustrates a flow diagram of a method 425 for generating an adjustment factor, or value, based on a vehicle's operational data collected by a data acquisition unit. Method 425 begins when method 400 reaches step 425 after step 420 as shown in FIG. 4. Continuing with discussion of FIG. 5, method 425 compares information stored in a first memory portion with a criteria stored in a second memory portion. For example, if a TCU at a vehicle is performing the method, the memory portions could be in a memory coupled to a processor of the TCU. If a TOC is performing the method, the memory portions would typically be coupled to processors at the TOC, although as discussed above, computing resources may be distributed geographically so that the memory portions may not be physically collocated.

If the criteria define a range of values, for example, 18 to 20 miles per gallon, then the method would determine whether the data stored in the first portion represents MPG and if it is greater than, less than, or equal to a MPG value between, and including 18 and 20. Similarly, if an interested entity chooses to use another criteria, for example number of engine revolutions in a given period, then the criteria could define a maximum value, or a range centered on a value, representing an estimated number of driven miles for a given vehicle equipped a certain way. For example, two pickup trucks could be identically equipped, except a first one has a differential gear ratio that results in a final drive gear ratio of 2.5:1 and the second one has a differential gear ratio that results in a final drive ratio of 2.16:1. Thus, assuming a tire diameter of 31.6", the engine of the first one would turn approximately 1596 revolutions for each traveled mile if the vehicle is traveling at steady state on a flat surface (if the vehicle travels 60 miles per hour, the number of revolutions per mile also equals the number of revolutions per minute). For the same driving conditions, the engine of the second vehicle would turn approximately only 1379 revolutions per mile, and per minute assuming a vehicle speed of 60 MPH. Further, based on a traditional insurance industry mileage value, the engine of the first vehicle would turn 11,970,000 revolutions in traveling 7,500 miles under the hypothetical steady state, flat conditions (the vehicle is in high gear for the entire 7,500 miles), and the engine of the second vehicle would turn only 10,342,500 under similar conditions. Thus, an upper limit criterion of engine revolutions for the first vehicle might be 11,970,000×1.01675=12,170,498 (the 1.01675 criterion traffic factor accounts for a nominal number of starts in low gears from a traffic control device, such as a stop sign or traffic light). One will appreciate that the traffic factor, as well as the 7,500 assumed distance, are given for purposes of illustration, and an interested entity, such as an insurance company, may apply a different criterion factor according to its actuarial statistics and calculations.

At step 427, method 425 may determine that the actual number of revolutions the first truck's engine turned during a given billing period was 12,000,000, which would fall within a range of 10,954,538 (roughly corresponding to 90% of 7,500 miles)-12,170,498, met the criteria, and the method would return to step 450 of method 400. In this scenario, method 400 would not adjust a charge at step 450 because the number of revolutions met the predetermined criteria of not exceeding a maximum limit and being higher than a minimum.

Alternatively, method 425 may skip step 427 and just determine whether the actual number of revolutions during the billing period exceeded the upper limit criterion for engine revolutions during a billing period without evaluating whether the actual revolutions was higher or lower than a threshold. If either a TCU, or TOC, or other computer system, is configured to perform method 425 without performing step 427, or if the computer has already performed step 427, method 425 advances to step 429. At step 429, the computer performing method 425 determines whether the actual data is better than the baseline. In other words, with respect to revolutions, a 'better' result (from the view point of the interested entity) would be fewer revolutions than the maximum criterion. If the actual results are not better than the criterion, method 425 advances to step 431 and provides a means, such as a telephone menu, a computer user interface, a web page, a cellphone application, etc., for an insured (or renter in the case of a rented vehicle, or a driver in the case of a vehicle fleet operator) to make a choice. The insured, or renter, or driver, may use the interface to deduct from a baseline number of revolutions of a future billing period an amount of revolutions that the actual exceeded the criteria. The insured, renter, or driver might do this to avoid an increase in the charge for the most recent billing period. Alternatively, the computer device performing the steps of method 425 may have been configured to automatically either decline deducting, or to deduct revolutions, from a future month. Also, the device performing method 425 may have been configured to only permit deducting revolutions for a certain number of months, or every other month, or to otherwise regulate the deducting of revolutions from future months.

If either an insured declines to deduct revolutions, or method 425 has been configured to decline deducting revolutions, from a future billing period, the computer running the method computes an increased charge to a base billing rate at step 433 and then passes a value representing an increase to a charge when returning to step 450 of method 400 shown in FIG. 4. If at step 431 method 425 determines, either from manual input from an insured, or automatically based on preprogrammed logic, or from an application, that the insured wants to deduct revolutions from a maximum criterion of a future billing period, the computer device performing the steps of method 425 computes a revised upper limit criterion for the future billing period at step 435, and then passes a value representing no adjustment to a charge when returning to step 450 of method 400 shown in FIG. 4. In this scenario method 400 would not adjust a charge at step 450.

Returning to the description of step 429 shown in FIG. 5, method 425 advances to step 437 if the method determines that the insured drove 'better' than the criterion (i.e., fewer revolutions than a maximum, higher average miles per gallon than a predetermined threshold, fewer revolution-hours than a maximum limit, etc.). The method may provide an interface for the insured to request that the difference between the actual data and the maximum criterion be applied as a credit to a future month in lieu of a reduction in a charge related to use of a vehicle during a recent, or current, billing period. Similar to the interface discussed in connection with step 431, at step 437 method 425 may act upon an input from an insured in deciding, or the device performing method 425 may be configured to automatically decide, whether an insured wants to use his better driving behavior for a reduction in a current charge, or to credit a future billing period by increasing the maximum criterion (or reducing the MPG threshold) in a future month. If the former, the computer performing the steps of method 425 computes a reduced charge for a current billing period at step 439 and passes a value representing a reduction adjustment to a charge when returning to step 450 of method 400, which adjusts the charge based on the adjustment value returned from method 425. If method 425 determines at step 437 that the insured wishes to use his current good driving to relax the criteria in future month, method 425 updates a baseline for a future month by increasing a maximum criteria (or reducing an MPG threshold) at step 441. Method 425 then passes a value representing no adjustment to the current charge as it returns to step 450 of method 400, which does make an adjustment to the current baseline charge.

The processing of the disclosed methods and systems can be performed by software components. The disclosed system and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

This present patent application uses the term 'insured' in the context of an insurance company scenario where an individual, or entity, has a contractual relationship with an insurance company. However, this application contemplates other embodiments, aspects, and scenarios and the inventors do not limit the claims only to an 'insured.' The claims contemplate that a vehicle user, who places performance demands on a vehicle may include anyone driving, or operating, a vehicle that has been associated with an insured's insurance account, a renter's lease, an employee's record, or other means of associating use of a vehicle with a user an account, or a contract. Thus, although some embodiments and aspects described above relate to an insurance company scenario, one skilled in the art will appreciate that instead of an insured, terms other than 'insured' could be used to refer to other users, owners, operators, drivers, renters, etc, as appropriate for a given scenario or aspect other than an insurance scenario.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for adjusting a charge related to use of a vehicle during a period based on performance demands, comprising:
   collecting operational data from a vehicle with a data acquisition device configured to interface with an information bus of the vehicle;
   storing the operational data to a first memory portion of the data acquisition device;
   comparing with the data acquisition device the operational data stored in the first memory with predetermined criteria;
   transmitting with the data acquisition device the operational data towards a central computer;
   determining with the central computer whether the operational data falls outside the predetermined criteria; and
   adjusting with the central computer the charge if the operational data falls outside the predetermined criteria.

2. The method of claim wherein the operational data includes an average miles per gallon associated with the use during the period.

3. The method of claim 1 wherein the period is one month.

4. The method of claim 2 wherein the average miles per gallon is derived from a measured amount of fuel used and mileage traveled during the period.

5. The method of claim 1 wherein the operational data includes the total number of engine revolutions during the period.

6. The method of claim 1 wherein the operational data includes an amount of fuel used in the vehicle during the period.

7. A method for adjusting a charge related to use of a vehicle during, a period based on performance demands, comprising:
   receiving operational data collected and transmitted from a vehicle with a data acquisition device configured to interface with an information bus of the vehicle;
   storing the operational data to a first memory portion;
   comparing the operational data stored in first memory with predetermined criteria stored in a second memory portion;
   determining whether the operational data falls outside the predetermined criteria; and
   adjusting the charge if the operational data falls outside the predetermined criteria.

8. The method of claim 7 wherein the operational data includes an average miles per gallon associated with the use during the period.

9. The method of claim 7 wherein the period is one month.

10. The method of claim 8 wherein the average miles per gallon is derived from a measured amount of fuel used and mileage traveled during the period.

11. The method of claim 7 wherein the operational data includes the total number of engine revolutions during the period.

12. The method of claim 7 wherein the operational data includes an amount of fuel used in the vehicle during the period.

13. A central computer configured to perform a method for adjusting a charge related to use of a vehicle during a period based on performance demands, the steps of the method comprising:
   receiving operational data, the operational data being collected and transmitted from a vehicle using a data acquisition device configured to interface with an information bus of the vehicle:
   storing the operational data to a first memory portion in the central computer;
   comparing the operational data stored in the first memory portion with predetermined criteria stored in a second memory portion in the central computer;
   determining whether the operational data falls outside the predetermined criteria; and
   adjusting the charge if the operational data falls outside the criteria.

14. The central computer of claim 13 wherein the central computer is coupled to an internetwork and is operated by a telematics services provider.

* * * * *